United States Patent [19]

Posey et al.

[11] Patent Number: 5,631,655
[45] Date of Patent: May 20, 1997

[54] SYSTEM AND METHOD FOR RADAR RECEIVER HARMONIC DISTORTION AND SPURIOUS RESPONSE CONTROL

[75] Inventors: William P. Posey, Palos Verdes Estates; Howard S. Nussbaum, Los Angeles, both of Calif.

[73] Assignee: Hughes Electronics, Los Angeles, Calif.

[21] Appl. No.: 576,327

[22] Filed: Dec. 21, 1995

[51] Int. Cl.$^6$ ............................................. G01S 13/52
[52] U.S. Cl. ................................................ 342/162
[58] Field of Search ........................... 342/195, 128, 342/134, 200, 202, 203, 159, 162

[56] References Cited

U.S. PATENT DOCUMENTS

| | | |
|---|---|---|
| 4,042,925 | 8/1977 | Albanese et al. ................... 342/162 |
| 4,234,880 | 11/1980 | Klemm ................................. 342/159 |
| 5,173,703 | 12/1992 | Mangiapane et al. ............... 342/159 |
| 5,262,785 | 11/1993 | Silverstein et al. ................. 342/162 |

*Primary Examiner*—Daniel T. Pihulic
*Attorney, Agent, or Firm*—Leonard A. Alkov; Wanda K. Denson-Low

[57] ABSTRACT

A modulation is applied to a received radar signal prior to analog-to-digital (A/D) conversion, and is removed subsequent to A/D conversion, to mitigate the effects of nonlinear receiver harmonic distortions and receiver spurious responses. The received target and clutter signals pass unchanged through the receiver to the digital signal processing. Harmonic distortion products and spurious responses introduced in the receiver after the modulation has been applied are distorted by the demodulation signal. By proper selection of the modulation waveform, coherent harmonic distortion products and spurious responses are converted to wideband noise reducing the level of interference that competes with targets in the affected Doppler filters.

17 Claims, 4 Drawing Sheets

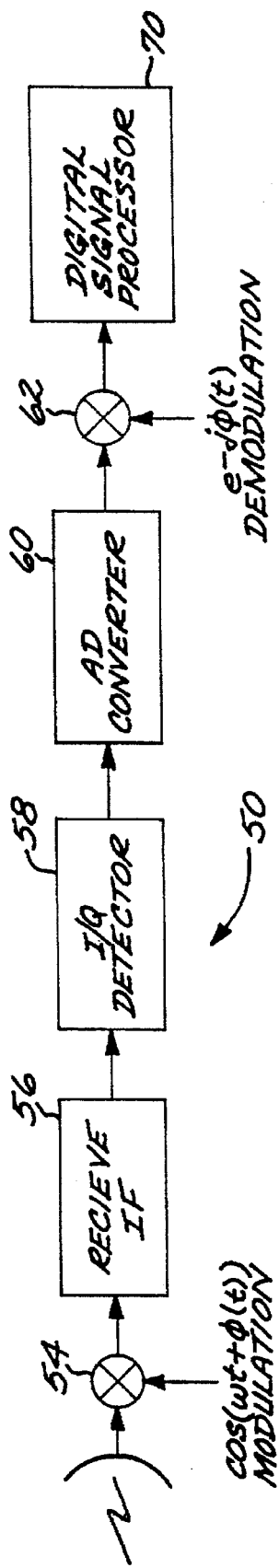
FIG. 1
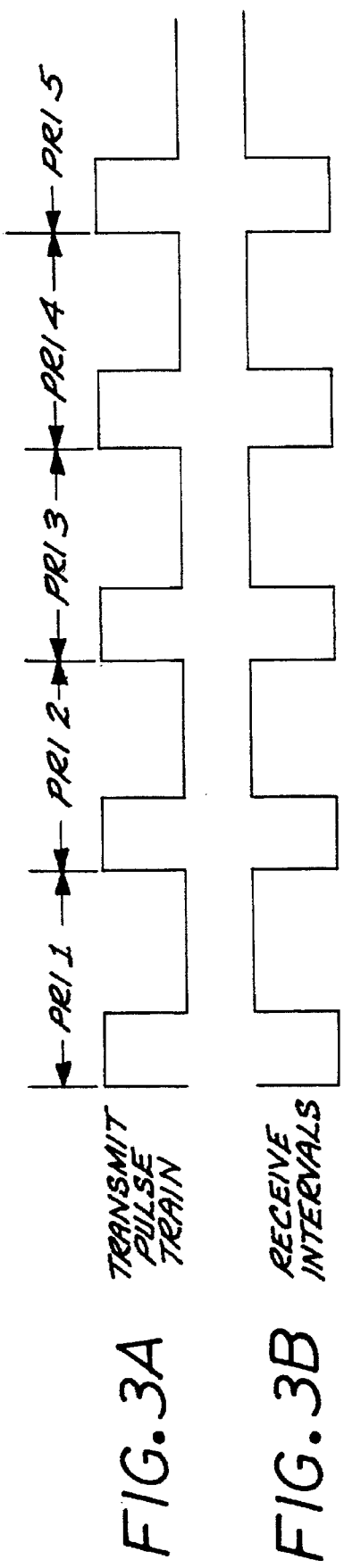
FIG. 3A TRANSMIT PULSE TRAIN
FIG. 3B RECEIVE INTERVALS
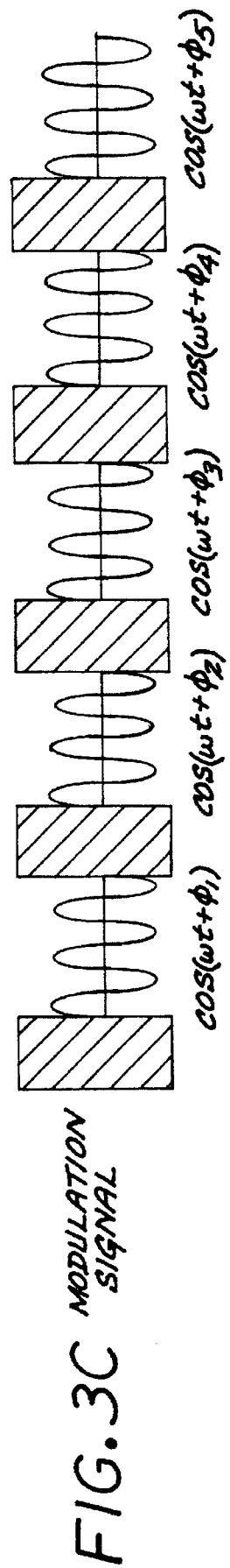
FIG. 3C MODULATION SIGNAL

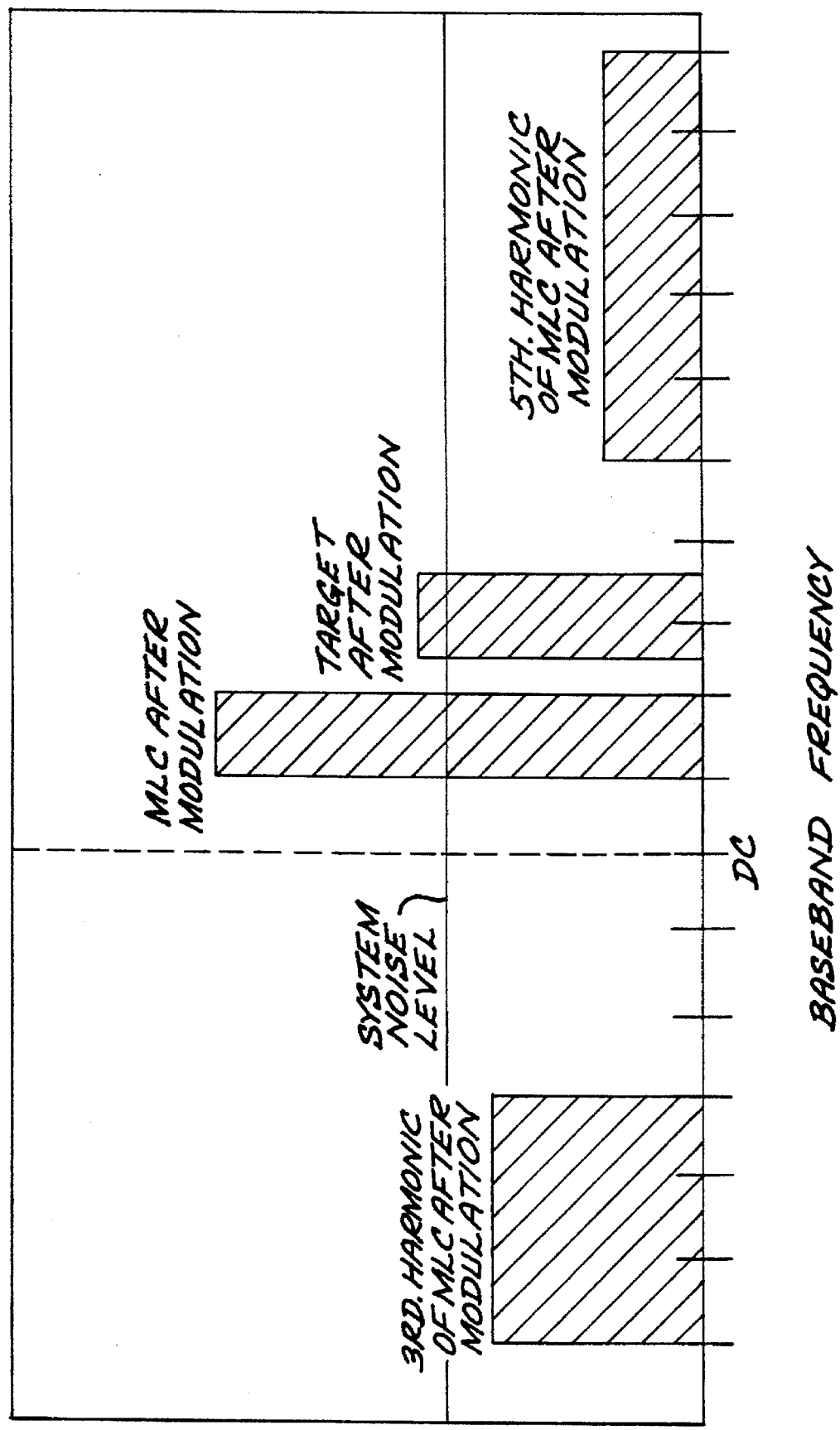

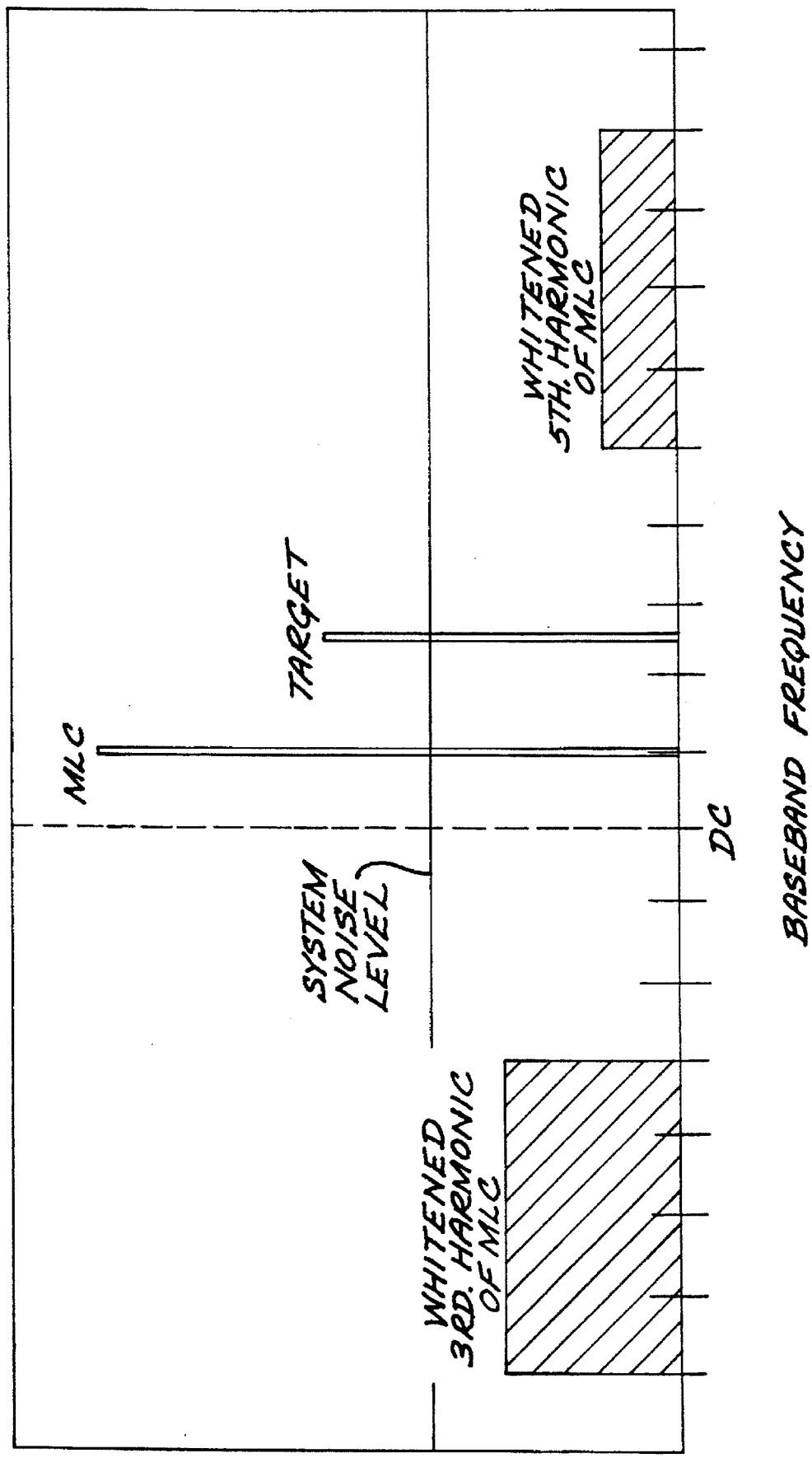

SYSTEM AND METHOD FOR RADAR RECEIVER HARMONIC DISTORTION AND SPURIOUS RESPONSE CONTROL

This invention was made with Government support under contract awarded by the Government. The Government has certain rights in this invention.

CROSS-REFERENCE TO RELATED APPLICATIONS

This application is related to the following co-pending, commonly assigned applications: DIGITAL FREQUENCY DIVIDER PHASE SHIFTER, S. I. Hsu et al, Ser. No. 08/576,329, filing date Dec. 21, 1995, attorney docket number PD-93310; DISCRETE PHASE MODULATOR, H. S. Nussbaum et al., Ser. No. 08/576,325, filing date Dec. 21, 1995, attorney docket number PD-93287; PRECISION DIGITAL PHASE SHIFTER, S. D. Taylor et al., Ser. No. 08/576,328, filing date Dec. 21, 1995, attorney docket number PD-92593; PRECISION DIGITAL PHASE SHIFT ELEMENT, S. D. Taylor et al., Ser. No. 08/576,330, filing date Dec. 21, 1995, attorney docket number PD-95214; and DIGITAL COUNTER AND COMPARATOR BASED PRECISION PHASE SHIFT ELEMENT, S. D. Taylor et al., Ser. No. 08/576,330, filing date Dec. 21, 1995, attorney docket number PD-95215; the entire contents of these co-pending applications are incorporated herein by this reference.

TECHNICAL FIELD OF THE INVENTION

This invention relates to radar systems, and more particularly to a technique for modulating a radar return signal prior to analog-to-digital conversion to control harmonic distortion and spurious responses introduced by the receiver.

BACKGROUND OF THE INVENTION

High performance airborne radars require extreme suppression of harmonic distortion and spurious responses to avoid false alarms in the presence of ground clutter returns. These requirements impose challenging linearity and spurious response requirements on receiver/exciter designs. Conventionally meeting these requirements through receiver design techniques, such as using high dynamic range components, filtering and isolation, etc., presents a design problem that challenges the state of the art.

Clutter tuning has been used to place clutter returns at a position in the spectrum where interference with the target detection process by harmonics of Mainlobe Clutter (MLC) is minimized. This can be conventionally accomplished with a finely tunable frequency synthesizer which generates an analog modulation used to tune the clutter return signals. The extremely low sideband noise and spurious levels required of the synthesizer itself make the design of the synthesizer challenging and this approach only addresses harmonically generated distortion.

The conventional technique for controlling receiver harmonic distortion involves the use of high dynamic range components and clutter tuning. The conventional technique for controlling receiver spurious responses involves the use of synchronous frequency plans along with filtering and isolation techniques.

SUMMARY OF THE INVENTION

In accordance with the invention, a radar return signal is modulated prior to analog-to-digital (A/D) conversion to control harmonic distortion and spurious responses introduced by the receiver after the modulation. By proper selection of the modulation, the harmonic distortion products and spurious responses can be converted into broadband noise, reducing the level of interference that competes with targets in the affected Doppler filters and changing the nature of the problem caused by these unwanted signals from a false alarm problem to the more tractable problem of target detection in noise.

This invention provides an alternative technique to control the undesired affects of harmonic distortion and spurious receiver responses. By modulating the return signal prior to the critical receiver sections, the undesired receiver responses are converted from coherent lines into broadband noise. The power spectral density of this residual broadband noise at a given frequency will necessarily be less than the original undesired coherent line. Their effect on the detection process is therefore reduced; and furthermore, they can simply be treated as another source of broadband clutter residual.

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 is a simplified block diagram of a circuit for applying modulation to a received radar signal-prior to A/D conversion and removing the modulation prior to digital signal processing.

FIG. 2B shows these same signals after modulation designed to spread their energy over a bounded spectral region has been applied. FIG. 2C illustrates the signals after they have passed through the demodulator.

FIG. 3A shows the transmit pulse waveform. FIG. 3B shows the receive intervals. FIG. 3C shows the modulation signal applied to the received signals prior to A/D conversion.

DETAILED DESCRIPTION OF THE PREFERRED EMBODIMENT

Figure 2A:
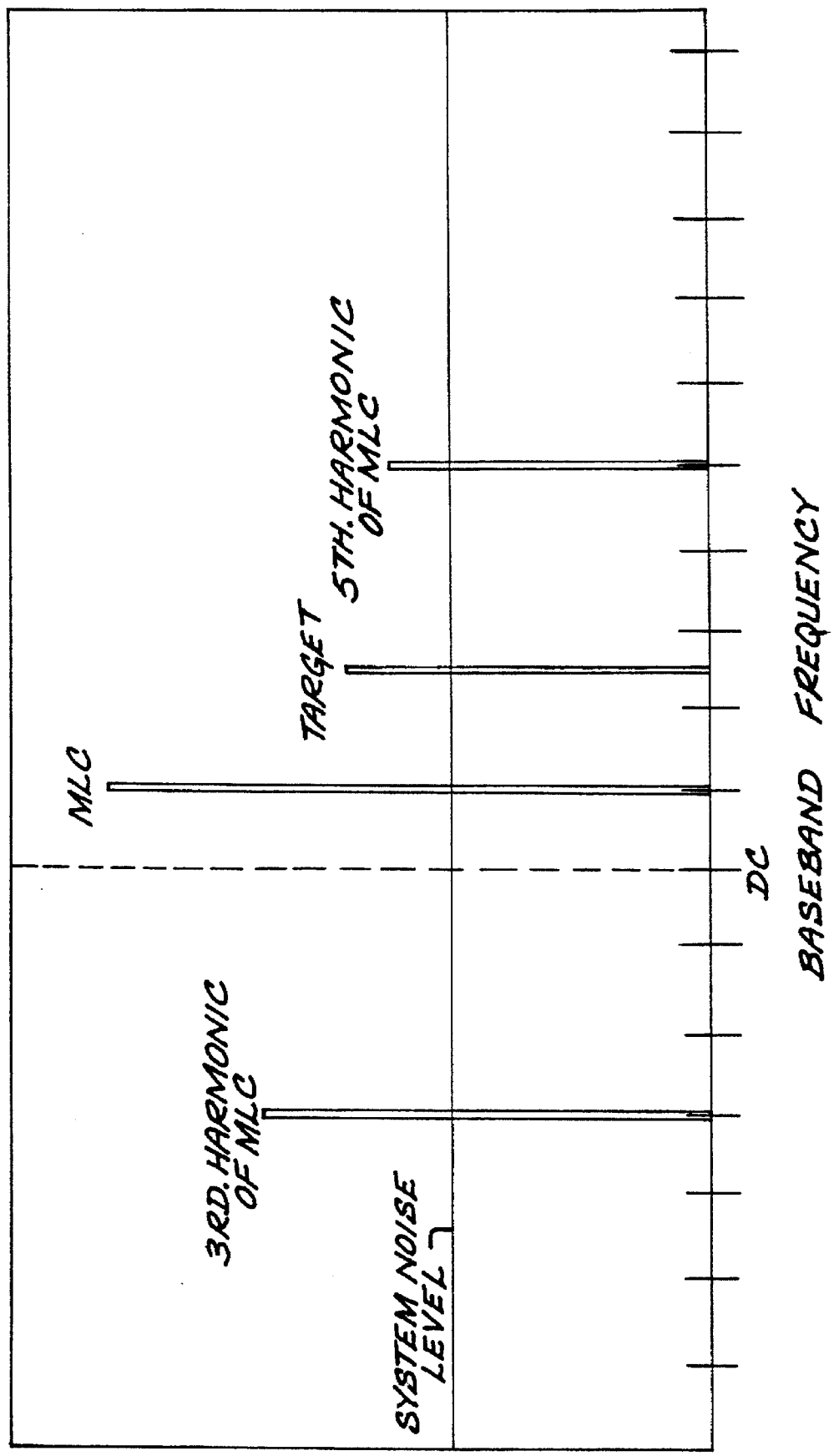
FIG. 2A illustrates a baseband representation of Mainlobe Clutter (MLC) and target returns along with third and fifth order harmonic distortion of MLC produced by a nonlinear receiver.

FIG. 1 is a simplified schematic block diagram of a radar receive system 50 embodying this invention. This system is part of an active radar, wherein excitation pulses are radiated into free space, reflected by the target, and return to the receive system for reception and processing. The receive system includes an antenna 52, which provides radar return signals. The signals from the antenna 52 are modulated and down converted to an intermediate frequency (IF), in accordance with the invention, with a modulation signal $\cos(\omega t + \phi(t))$, at mixer 54. The modulated signal is then processed by IF stage 56. The modulated IF signal is passed through I/Q detector 58, and converted from analog to digital form by A/D convertor 60. The digitized, modulated signal is demodulated by mixing this signal at digital mixer 62 with a demodulation signal $e^{-j\phi(t)}$. The demodulated, digitized signal is then passed to the digital signal processor 70 for radar signal processing in the conventional manner.

This invention recognizes that the modulation applied to the incoming radar signal prior to A/D conversion, as shown on FIG. 1, can be used to mitigate the affect of nonlinear receiver harmonic distortions and receiver spurious responses. In accordance with the invention, the modulation and demodulation waveforms are specifically chosen to allow the received target and clutter signals to pass unchanged through the receiver to the digital signal processing. However, harmonic distortion products and spurious responses introduced in the receiver after the modulation has been applied will be affected by the demodulation process. By proper selection of the modulation waveform, coherent harmonic distortion products and spurious responses can be converted to wideband noise, reducing the level of interference that competes with targets in the affected Doppler filters and changing the nature of the problem caused by these unwanted signals from a false alarm problem to a more tractable subclutter visibility problem.

FIGS. 2A–2C illustrate the effect of this process on typical radar return signals assuming a phase modulation waveform having a quadratic phase progression. FIG. 2A shows a baseband representation of MLC and target returns along with the third and fifth harmonic distortion of MLC produced by a nonlinear receiver. It can be seen that the baseband harmonics of MLC can exceed the system noise level and produce false alarms.

FIG. 2B shows a similar baseband representation of MLC and target returns along with the third and fifth harmonic distortion of MLC produced by the nonlinear receiver after the whitening modulation has been applied in accordance with the invention, but before whitening demodulation. The phase modulation spreads all spectral components. The MLC and target signals are spread in frequency by the modulation bandwidth while the distortion products are spread even further. The harmonics are spread by n times the modulation bandwidth, where n is the harmonic number.

FIG. 2C shows the signals of FIG. 2B after they have passed through the demodulator. Since the modulation and demodulation waveforms are specifically chosen to cancel each other, the target and MLC returns are faithfully reconstructed. The distortion products, however, are left spread in frequency with reduced power spectral density. A conventional Constant False Alarm Rate (CFAR) thresholding scheme can then prevent the distortion products from causing radar false alarms.

In many cases proper selection of the radar waveform and the modulation and demodulation waveforms will result in negligible or acceptable interference levels in the Doppler clear region where target detection will be attempted, providing a superior solution to Doppler tuning and allowing relaxation of receiver linearity and spurious response requirements.

FIG. 3A illustrates the radar transmit pulse train waveform, which consists of a train of RF pulses separated in time to form pulse repetition intervals (PRIs). The radar receiver is gated off during the active transmit pulse events, and no signal is received during this period as indicated in FIG. 3B.

The modulation/demodulation signals can be continuous and analog, e.g., linear FM, or, preferably as shown in FIG. 3C, discrete phase modulation with step changes every radar pulse. Thus, during PRI 1, the discrete phase modulation signal is $\cos(\omega t+\phi_1)$. During PRI 2, the discrete phase modulation is $\cos(\omega t+\phi_2)$. During PRI 3, the discrete phase modulation is $\cos(\omega t+\phi_3)$, and so on. (FIG. 3C is representative only, and does not accurately show the phase progression from PRI to PRI.) The phase modulation sequence $\phi_1$, $\phi_2$, $\phi_3$ . . . can be chosen to be confined in frequency such as a quadratic phase progression or broadband such as a psuedo random sequence. The discrete phase modulation has the advantage that the radar receiver remains tuned to a fixed frequency over a coherent array time and allows the modulation to be completely removed after A/D conversion. Discrete phase modulation can easily be injected on one of the down conversion local oscillators and is compatible with a precise digital phase shifter described in commonly assigned and co-pending application Ser. No. 08/576,328, filed Dec. 21, 1995, entitled "Precision Digital Phase Shifter," by S. D. Taylor et al., attorney docket number PD 92593.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A radar receive system, comprising:

an antenna for receiving radar return signals;

modulator apparatus for downconverting and modulating the radar return signals with a modulation signal;

intermediate frequency (IF) circuitry for processing the modulated radar return IF signals;

detector circuitry responsive to the IF signals to provide analog detector signals;

analog-to-digital converter for converting the analog detector signals into digital detector signals;

demodulator for removing said modulation signal from said digital detector signals to provide digital demodulated signals; and digital signal processor for processing said digital demodulated signals to provide radar output data;

wherein the modulation and demodulation mitigates the effect of nonlinear receiver harmonic distortions and receiver spurious signal responses.

2. The system of claim 1 wherein said radar is responsive to a transmit pulse train operating with pulse repetition intervals, and the modulating signal undergoes step changes in phase from pulse-to-pulse.

3. The system of claim 1 wherein said demodulator comprises a mixer for mixing the digital detector signal with a demodulating signal to provide said digital demodulated signals.

4. The system of claim 3 wherein the modulator is a first phase modulator which phase modulates the radar return signals with phase modulation, and said demodulator is a second phase modulator which removes the phase modulation applied by the first phase modulation to said digital detector signal.

5. The system of claim 4 wherein said modulating signal has a waveform $\cos(\omega t+\phi(t))$, and said second modulator applies a demodulating signal having a waveform $e^{-j\phi(t)}$.

6. A method for mitigating the effect of nonlinear receiver harmonic distortion and receiver spurious responses in a radar receive system, comprising the following steps:

receiving from free space radar return signals with an antenna;

modulating the radar return signals with a modulation signal;

detecting the modulated radar return signals to provide analog detector signals;

converting the analog detector signals into digital detector signals;

demodulating the digital detector signals to remove said modulation signal from said digital detector signals and provide digital demodulated signals;

wherein the modulation and demodulation mitigates the effect of nonlinear receiver harmonic distortions and receiver spurious signal responses.

7. The method of claim 6 wherein said radar is responsive to a transmit pulse train operating with pulse repetition intervals, and the modulating signal undergoes step changes in phase from pulse-to-pulse.

8. The method of claim 6 wherein said demodulating step comprises mixing the digital detector signal with a demodulating signal to provide said digital demodulated signals.

9. The method of claim 6 wherein the modulating step phase modulates the radar return signals with phase modulation, and the demodulating step removes the phase modulation.

10. The method of claim 9 wherein said modulating signal has a waveform $\cos(\omega t + \phi(t))$, and said demodulating step includes modulating the digital detector signals with a waveform $e^{-j\phi(t)}$.

11. An active radar receive system, comprising:

an antenna for receiving active radar return signals;

modulator apparatus for modulating the radar return signals with a modulation signal;

detector circuitry responsive to the modulated return signals to provide analog detector signals;

analog-to-digital converter for converting the analog detector signals into digital detector signals;

demodulator for removing said modulation signal from said digital detector signals to provide digital demodulated signals;

wherein the modulation and demodulation mitigates the effect of nonlinear receiver harmonic distortions and receiver spurious signal responses.

12. The system of claim 11 wherein said radar is responsive to a transmit pulse train operating with pulse repetition intervals, and the modulating signal undergoes step changes in phase from pulse-to-pulse.

13. The system of claim 11 wherein said demodulator comprises a mixer for mixing the digital detector signal with a demodulating signal to provide said digital demodulated signals.

14. The system of claim 13 wherein the modulator is a first phase modulator which phase modulates the radar return signals with phase modulation, and said demodulator is a second phase modulator which remove the phase modulation applied by the first phase modulation.

15. The system of claim 14 wherein said modulating signal has a waveform $\cos(\omega t + \phi(t))$, and said second modulator applies a demodulating signal having a waveform $e^{-j\phi(t)}$.

16. The system of claim 11 further comprising circuitry for converting the modulated radar return signals to intermediate frequency (IF) modulated signals.

17. The system of claim 11 further comprising digital signal processor responsive to the digital demodulated signals to provide radar return data.

* * * * *